US012528346B2

(12) United States Patent
Yoshida et al.

(10) Patent No.: US 12,528,346 B2
(45) Date of Patent: Jan. 20, 2026

(54) VEHICLE-BODY FRONT STRUCTURE INCLUDING SIDE FRAME PROTRUSIONS

(71) Applicant: Mazda Motor Corporation, Hiroshima (JP)

(72) Inventors: Kota Yoshida, Hiroshima (JP); Taiki Yotsuyanagi, Hiroshima (JP); Satoshi Nakamura, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 582 days.

(21) Appl. No.: 18/109,863

(22) Filed: Feb. 15, 2023

(65) Prior Publication Data
US 2023/0264746 A1   Aug. 24, 2023

Related U.S. Application Data

(63) Continuation of application No. 18/109,363, filed on Feb. 14, 2023.

(Continued)

(30) Foreign Application Priority Data

Feb. 24, 2022   (JP) .................................. 2022-026685
Feb. 24, 2022   (JP) .................................. 2022-026690

(Continued)

(51) Int. Cl.
*B62D 25/08* (2006.01)
*B60K 1/04* (2019.01)
(Continued)

(52) U.S. Cl.
CPC .............. *B60K 1/04* (2013.01); *B60L 3/0007* (2013.01); *B60L 50/66* (2019.02); *B62D 21/02* (2013.01);
(Continued)

(58) Field of Classification Search
CPC .... B62D 25/085; B62D 25/081; B62D 25/20; B62D 25/082; B62D 25/14; B62D 25/16;
(Continued)

(56) References Cited

U.S. PATENT DOCUMENTS 5,501,289 A * 3/1996 Nishikawa ............... B60K 1/04
  280/783
8,011,695 B2 * 9/2011 Kosaka ................. B62D 21/152
  280/784

(Continued)

FOREIGN PATENT DOCUMENTS

JP   2009-101952 A   5/2009
JP   2012045995 A    3/2012
(Continued)

OTHER PUBLICATIONS

Extended European search report issued on Jun. 23, 2023, in corresponding European patent Application No. 23157157.1, 7 pages.

(Continued)

*Primary Examiner* — James M Dolak
(74) *Attorney, Agent, or Firm* — XSENSUS LLP

(57) ABSTRACT

A vehicle-body front structure includes a front-side battery frame which is provided in a front of the battery casing 10a pair of left and right side frames which extend from the front-side battery frame toward vehicle front to be positioned on vehicle-width-direction outer sides toward front, a pair of left and right impact absorption members in front of the side frames, a front member between the left and right impact absorption members, and left and right projections arranged between the left and right side frames and the left and right impact absorption members and protrude to the vehicle-width-direction outer sides of fronts of the left and right side frames, respectively.

15 Claims, 8 Drawing Sheets

Related U.S. Application Data

(60) Provisional application No. 63/445,026, filed on Feb. 13, 2023.

(30) Foreign Application Priority Data

| Feb. 24, 2022 | (JP) | 2022-026703 |
| Feb. 24, 2022 | (JP) | 2022-026708 |
| Feb. 24, 2022 | (JP) | 2022-026710 |

(51) Int. Cl.
| *B60L 3/00* | (2019.01) |
| *B60L 50/60* | (2019.01) |
| *B62D 21/02* | (2006.01) |
| *B62D 21/11* | (2006.01) |
| *B62D 21/15* | (2006.01) |
| *B62D 25/20* | (2006.01) |
| *H01M 50/242* | (2021.01) |
| *H01M 50/249* | (2021.01) |
| *B60L 53/12* | (2019.01) |

(52) U.S. Cl.
CPC ............ *B62D 21/11* (2013.01); *B62D 21/15* (2013.01); *B62D 21/152* (2013.01); *B62D 21/157* (2013.01); *B62D 25/08* (2013.01); *B62D 25/20* (2013.01); *H01M 50/242* (2021.01); *H01M 50/249* (2021.01); *B60K 2001/0438* (2013.01); *B60L 53/12* (2019.02); *H01M 2220/20* (2013.01)

(58) Field of Classification Search
CPC .......................... B62D 25/2036; B62D 25/08; B62D 25/2018; B62D 21/152; B62D 21/15; B62D 21/11; B62D 21/155; B62D 21/157; B62D 21/02; B62D 24/00; B60N 2/015; B60N 2/005; B60N 2/00; B60L 50/60; B60L 50/50; B60L 50/00; B60L 50/66; B60L 3/0007; B60K 1/04; B60K 1/00; B60K 2001/0416; B60K 2001/0438; H01M 2220/20; H01M 50/242; H01M 50/20; H01M 50/249
See application file for complete search history.

(56) References Cited

U.S. PATENT DOCUMENTS

| 8,336,658 | B2* | 12/2012 | Rawlinson | B60K 1/04 429/96 |
| 8,479,858 | B2* | 7/2013 | Kodaira | B62D 21/17 180/68.5 |
| 8,608,230 | B2* | 12/2013 | Young | B62D 21/157 296/187.02 |
| 8,668,248 | B2* | 3/2014 | Ishizono | B62D 25/025 296/70 |
| 8,702,161 | B2* | 4/2014 | Charbonneau | B62D 21/157 296/187.12 |
| 8,733,487 | B2* | 5/2014 | Usami | B62D 21/11 180/68.5 |
| 8,833,839 | B2* | 9/2014 | Young | B62D 25/025 296/187.08 |
| 8,894,129 | B2* | 11/2014 | Katou | B62D 21/155 296/187.03 |
| 9,259,998 | B1* | 2/2016 | Leanza | B62D 25/20 |
| 9,281,505 | B2* | 3/2016 | Hihara | B62D 25/20 |
| 9,296,426 | B2* | 3/2016 | Delord | B62D 21/18 |
| 9,764,629 | B2* | 9/2017 | Schmalzrieth | B60K 1/04 |
| 9,926,017 | B1* | 3/2018 | Hamilton | B62D 21/02 |
| 9,937,781 | B1* | 4/2018 | Bryer | B62D 35/02 |
| 10,112,470 | B2* | 10/2018 | Hamilton | B62D 25/20 |
| 10,131,381 | B2* | 11/2018 | Ashraf | B62D 63/025 |
| 10,259,506 | B2* | 4/2019 | Ayukawa | B62D 25/025 |
| 10,279,693 | B2* | 5/2019 | Shimizu | B60L 50/66 |
| 10,421,345 | B2* | 9/2019 | Kerspe | B60P 3/20 |
| 10,494,034 | B2* | 12/2019 | Makowski | B62D 25/2036 |
| 10,589,790 | B2* | 3/2020 | Ayukawa | B62D 21/152 |
| 10,597,081 | B2* | 3/2020 | Ayukawa | B62D 25/2018 |
| 10,618,562 | B2* | 4/2020 | Shimizu | B62D 21/11 |
| 10,632,827 | B2* | 4/2020 | Ajisaka | B62D 25/08 |
| 10,688,856 | B2* | 6/2020 | Kasai | B60K 1/04 |
| 10,710,636 | B2* | 7/2020 | Uehata | B62D 21/02 |
| 10,752,292 | B2* | 8/2020 | Kawase | B62D 21/157 |
| 10,780,923 | B2* | 9/2020 | Caliskan | B60N 2/015 |
| 10,829,156 | B2* | 11/2020 | Otoguro | B62D 25/20 |
| 10,894,469 | B2* | 1/2021 | Page | B62D 21/02 |
| 10,938,007 | B2* | 3/2021 | Wesche | H01M 50/242 |
| 10,988,036 | B2* | 4/2021 | Park | B60L 50/66 |
| 10,988,186 | B2* | 4/2021 | Makowski | B60K 6/22 |
| 11,001,308 | B2* | 5/2021 | Atsumi | B62D 21/152 |
| 11,040,740 | B2* | 6/2021 | Grottke | B62D 27/065 |
| 11,059,519 | B2* | 7/2021 | Persson | B62D 21/02 |
| 11,124,244 | B2* | 9/2021 | Kim | B62D 25/02 |
| 11,148,721 | B2* | 10/2021 | Liu | B62D 21/08 |
| 11,173,776 | B2* | 11/2021 | Sasaki | B60K 1/04 |
| 11,214,310 | B2* | 1/2022 | Hong | B62D 25/025 |
| 11,220,298 | B2* | 1/2022 | Matsuda | B62D 25/20 |
| 11,279,409 | B2* | 3/2022 | Shimizu | B62D 21/152 |
| 11,485,416 | B2* | 11/2022 | Lian | B62D 25/2018 |
| 11,565,578 | B2* | 1/2023 | Shimizu | B60K 1/04 |
| 11,571,965 | B2* | 2/2023 | Shimanaka | F01N 13/001 |
| 11,745,574 | B2* | 9/2023 | Marginet | B62D 25/2018 180/68.5 |
| 11,753,077 | B2* | 9/2023 | Kellner | B62D 29/008 180/291 |
| 11,850,931 | B2* | 12/2023 | Nusier | B62D 21/02 |
| 12,145,653 | B2* | 11/2024 | Sotty | B62D 25/2045 |
| 12,220,980 | B2* | 2/2025 | Lee | B60K 1/04 |
| 12,246,773 | B2* | 3/2025 | Ganzhorn | B62D 21/155 |
| 12,246,777 | B2* | 3/2025 | Tanaka | B60K 1/00 |
| 12,371,104 | B2* | 7/2025 | Yoshida | B62D 21/15 |
| 12,384,467 | B2* | 8/2025 | Nishimura | B62D 25/14 |
| 12,388,132 | B2* | 8/2025 | Wang | H01M 10/613 |
| 12,388,138 | B2* | 8/2025 | Guo | B60K 1/04 |
| 12,388,145 | B2* | 8/2025 | Handing | H01M 50/244 |
| 12,391,108 | B2* | 8/2025 | Korada | B60L 50/64 |
| 12,401,078 | B2* | 8/2025 | Ishitobi | B60L 50/64 |
| 2012/0049571 | A1 | 3/2012 | Katou et al. | |
| 2012/0223113 | A1* | 9/2012 | Gaisne | H01M 50/249 224/538 |
| 2015/0166107 | A1 | 6/2015 | Delord et al. | |
| 2017/0021866 | A1 | 1/2017 | Kim | |
| 2018/0065461 | A1* | 3/2018 | Maier | B62D 25/2018 |
| 2018/0281863 | A1 | 10/2018 | Daikokuya et al. | |
| 2021/0101464 | A1* | 4/2021 | Matsushima | B60N 2/005 |
| 2023/0182821 | A1 | 6/2023 | Ganzhorn et al. | |

FOREIGN PATENT DOCUMENTS

| JP | 2015512354 A | 4/2015 |
| JP | 2018165095 A | 10/2018 |

OTHER PUBLICATIONS

Japanese Office Action issued Jan. 21, 2025, in corresponding Japanese Patent Application No. 2022-026708, 2pp.

* cited by examiner

VEHICLE-BODY FRONT STRUCTURE INCLUDING SIDE FRAME PROTRUSIONS

CROSS-REFERENCES TO RELATED APPLICATIONS

The present application is a continuation of U.S. patent application Ser. No. 18/109,363 filed on Feb. 14, 2023, which claims priority to Provisional Ser. No. 63/445,026, filed on Feb. 13, 2023, which claims benefit of Japanese Patent Application 2022-026685, filed Feb. 24, 2022, Japanese Patent Application 2022-026690, filed Feb. 24, 2022, Japanese Patent Application 2022-026703, filed Feb. 24, 2022, Japanese Patent Application 2022-026708, filed Feb. 24, 2022, and Japanese Patent Application 2022-026710, filed Feb. 24, 2022, the entire contents of each of which are incorporated herein by reference.

BACKGROUND

Field

The present disclosure relates to a vehicle-body front structure for an electric vehicle, for example.

Description of Related Art

For example, in a vehicle-body front portion of an automobile disclosed in Patent Literature 1, a pair of left and right front side frames extending in a vehicle front-rear direction are provided, and a front sub-frame is provided below those front side frames and in rear of an engine room. In a left-side front end portion and a right-side front end portion of the front sub-frame, a left pipe frame and a right pipe frame are respectively provided to extend toward vehicle front. The left pipe frame and the right pipe frame are inclined with respect to a center line extending in a front-rear direction of a vehicle so as to be positioned on vehicle-width-direction outer sides toward a front side.

Patent Literature 1 discloses that the left pipe frame and the right pipe frame are inclined to be positioned on the vehicle-width-direction outer sides toward the front side and an impact load can thereby properly be absorbed in a case of an offset collision in which the impact load is input from oblique front of the vehicle.

CITATION LIST

Patent Literature

[Patent Literature 1] Japanese Patent Laid-Open No. 2009-101952

SUMMARY

Problems to be Solved

Incidentally, in Patent Literature 1, a left pipe frame and a right pipe frame are inclined to be positioned on vehicle-width-direction outer sides toward a front side. However, the inventors have determined that in a case where an offset collision is presumed in which an impact load is input to the vehicle-width-direction outer sides of front portions of the left and right pipe frames, the impact load cannot be absorbed by the pipe frames.

The present disclosure has been made in consideration of such problems, and one or more embodiments is directed to enabling an impact load to be absorbed by a side frame even in a case where an offset collision occurs to a vehicle-width-direction outer side of a front portion of the side frame.

To solve the above and other problems, a first aspect of the present disclosure can be based on a vehicle-body front structure for an electric vehicle which includes a traveling motor and in which a battery casing housing a battery supplying electric power to the traveling motor is disposed below a floor panel. The vehicle-body front structure includes: a front-side battery frame which is provided in a front portion of the battery casing; a pair of left and right side frames which extend from the front-side battery frame toward vehicle front to be positioned on vehicle-width-direction outer sides toward front; a pair of left and right impact absorption members which are respectively provided in front of the left and right side frames; a front member which is suspended between the left and right impact absorption members; and a protruded member which is arranged between the side frame and the impact absorption member and protrudes to the vehicle-width-direction outer side of a front portion of the side frame.

In this configuration, for example, in a case where an offset collision is presumed in which an impact load is input to a left side of the front portion of the left side frame, the impact load is exerted on a left end portion of the front member, and the left impact absorption member is compressed and deformed. In this case, because a right-side portion (non-collision side) of the front member is fixed to the right side frame via the right impact absorption member, the front member performs rotational behavior in which its left-side portion moves rearward about the right-side portion as a pivot. Because the protruded member protruded to the vehicle-width-direction outer side is in rear of the left end portion of the front member, the left impact absorption member is compressed and deformed, and the left end portion of the front member thereafter contacts with the left protruded member. Accordingly, because the impact load is transmitted to the left side frame via the left protruded member and is input in a direction along an axis direction of the left side frame, the left side frame is axially compressed, and the impact load is thereby absorbed. The same applied to an offset collision in which an impact load is input to a right side of the front portion of the right side frame.

In a second aspect of the present disclosure, the vehicle-body front structure may include a frame bracket which couples rear portions of the left and right side frames with the front-side battery frame. The frame bracket may have a left-side support portion on the vehicle-width-direction outer side of the left side frame and supports the side frame from the vehicle-width-direction outer side and a right-side support portion on the vehicle-width-direction outer side of the right side frame and supports the side frame from the vehicle-width-direction outer side.

In this configuration, because when an impact load is input, the left and right side frames can be supported from the vehicle-width-direction outer sides by the left-side support portion and the right-side support portion, the left and right side frames are less likely to collapse to the vehicle-width-direction outer sides.

The front-side battery frame according to a third aspect of the present disclosure may extend in a vehicle width direction. Outer end portions of the front-side battery frame in the vehicle width direction may extend to the vehicle-width-direction outer side of a rear portion of the left side frame and extend to the vehicle-width-direction outer side of a rear portion of the right side frame, respectively.

In this configuration, an impact load input to the left or right side frame can be received and absorbed by the front-side battery frame.

The protruded member according to a fourth aspect of the present disclosure may have a base portion, fixed to the front portion of the side frame and to the impact absorption member and couples the impact absorption member with the side frame, and a protruded portion, which protrudes from the base portion to the vehicle-width-direction outer side.

In this configuration, a collision load in the above offset collision is input to the protruded portion of the protruded member. Because the protruded portion is a portion which protrudes from the base portion fixed to the side frame, an impact load input to the protruded portion is certainly transmitted to and absorbed by the side frame via the base portion.

In a fifth aspect of the present disclosure, outer end portions of the front member in the vehicle width direction may extend to the vehicle-width-direction outer side of the front portion of the left side frame and extend to the vehicle-width-direction outer side of the front portion of the right side frame, respectively.

In this configuration, a collision load in the above offset collision is likely to be input to the outer end portion of the front member in the vehicle width direction and, in addition, is also likely to be input to the protruded member.

In a sixth aspect of the present disclosure, when seen in a vehicle front-rear direction, the outer end portion of the front member in the vehicle width direction can be arranged so as to overlap with at least a part of the protruded member.

That is, the outer end portion of the front member in the vehicle width direction, to which a collision load in the above offset collision is input, is moved rearward, but at least a part of the protruded member is positioned in the rear, and it thereby becomes possible to certainly receive the collision load by the protruded member.

As described above, a protruded member which protrudes to a vehicle-width-direction outer side is arranged between a side frame and an impact absorption member. Accordingly, even in a case where an offset collision occurs to the vehicle-width-direction outer side of a front portion of the side frame, an impact load can be absorbed by the side frame.

BRIEF DESCRIPTION OF THE DRAWINGS

The scope of the present disclosure is best understood from the following detailed description of exemplary embodiments when read in conjunction with the accompanying drawings.

DETAILED DESCRIPTION

An embodiment will hereinafter be described in detail based on drawings. Note that the description of a preferable embodiment in the following is substantially only about examples and is not at all intended to restrict the present disclosure, applications thereof, or uses thereof.

Figure 1:
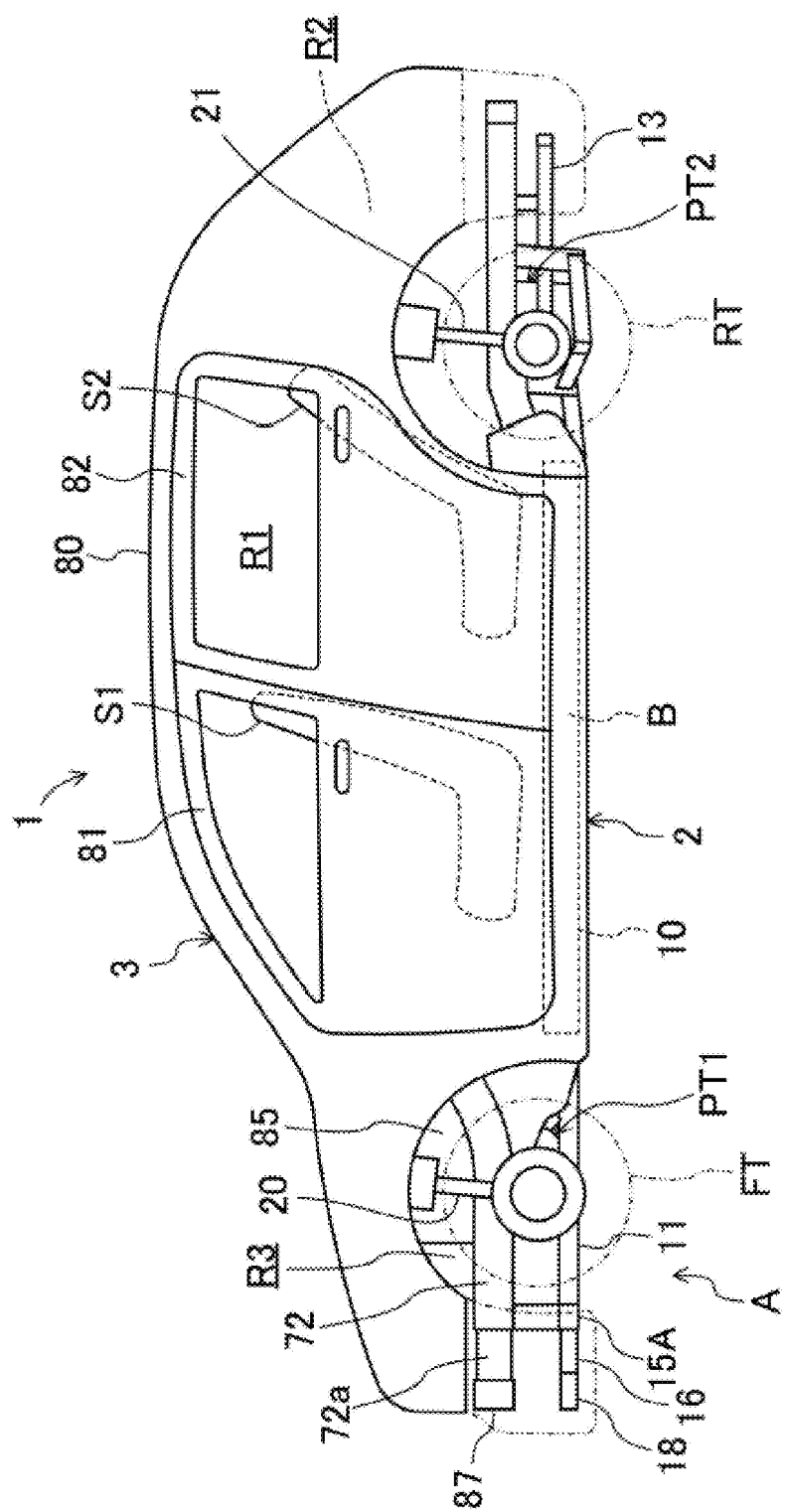
FIG. 1 is a side view of an electric vehicle according to an embodiment, in which a part of the electric vehicle is omitted for clarity.
Figure 2:
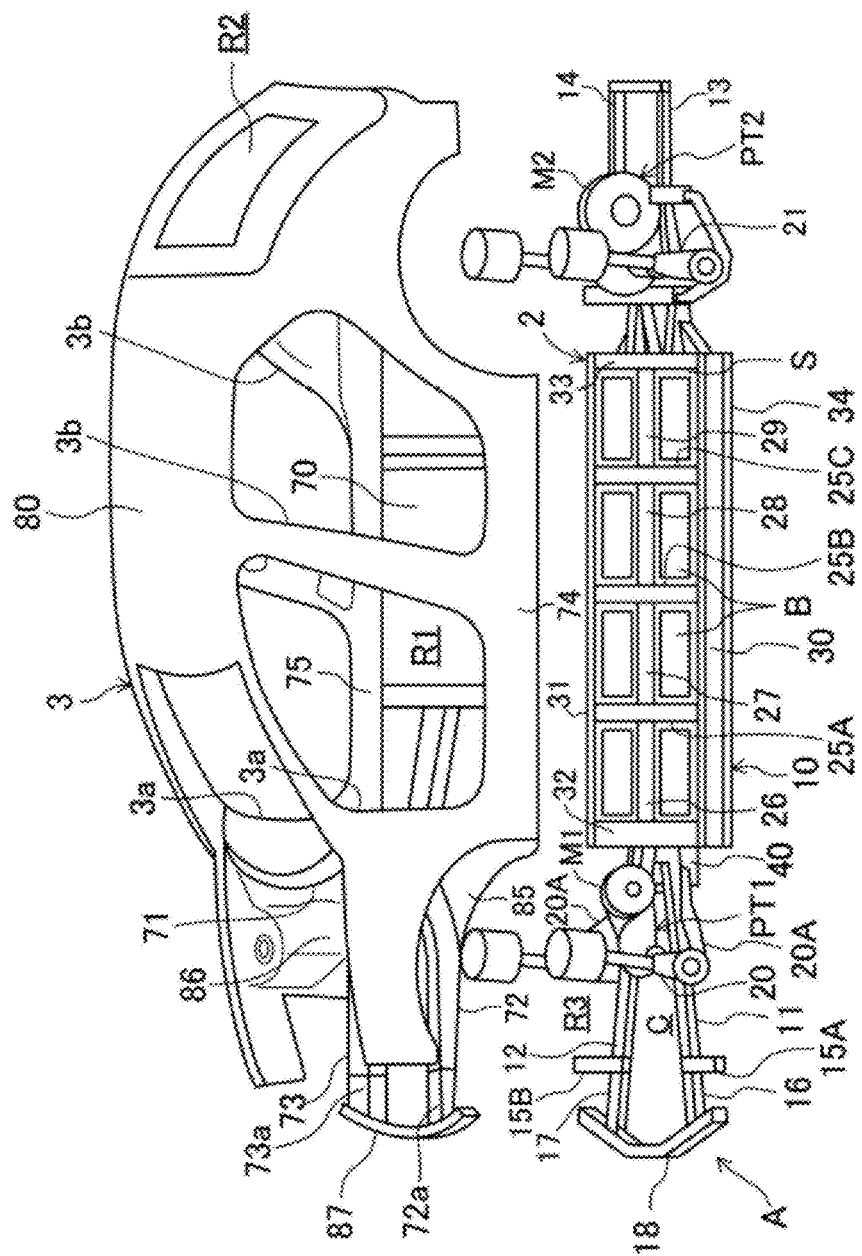
FIG. 2 is a side view illustrating a state where the electric vehicle is divided into a lower structure and an upper structure.

FIG. 1 is a left side view of an electric vehicle (electric automobile) 1 including a vehicle-body front structure A according to the embodiment. As illustrated in FIG. 2, the electric vehicle 1 includes a lower structure 2 and an upper structure 3. In FIG. 1, a front bumper, a rear bumper, front and rear wheels, and so forth are omitted and are illustrated by imaginary lines, and each portion is schematically illustrated. In FIG. 2, in addition to the components omitted in FIG. 1, doors, a bonnet hood, a front fender, window glass, front and rear lighting devices, interior materials, and so forth are omitted, and each portion is schematically illustrated.

Note that in the description of the embodiment, a vehicle front side will simply be referred to as "front", a vehicle rear side will simply be referred to as "rear", a vehicle right side will simply be referred to as "right", and a vehicle left side will simply be referred to as "left". A right-left direction of the vehicle is a vehicle width direction.

As illustrated in FIG. 1, the electric vehicle 1 is a passenger automobile. The electric vehicle 1 may be of any of a sedan type, a hatch-back type, a minivan type, and so forth, and its shape is not particularly limited. As illustrated in FIG. 2, in the electric vehicle 1, a vehicle cabin R1 is formed which serves as a staying space for an occupant. As illustrated in FIG. 1, a front seat S1 is provided on a front side in the vehicle cabin R1, and a rear seat S2 is provided in rear of the front seat S1 in the vehicle cabin R1. In the rear of the rear seat S2, a trunk R2 is provided in accordance with necessity. The vehicle cabin R1 and the trunk R2 are provided to the upper structure 3. Note that in the vehicle cabin R1, only the front seat S1 may be provided, or a third row seat may be provided in the rear of the rear seat S2.

Meanwhile, a space in front of the vehicle cabin R1 as a front portion of the electric vehicle 1 can be set as a power chamber R3, for example. That is, the vehicle-body front structure A is provided to the electric vehicle 1 which includes a front-side traveling motor M1, a rear-side traveling motor M2, batteries B supplying electric power to the traveling motors M1 and M2, and a battery casing 10 housing the batteries B. The battery casing 10 is disposed below a floor panel 70 described later.

The front-side traveling motor M1 produces a driving force for driving left and right front wheels FT, and the front-side power train PT1 is configured with only the front-side traveling motor M1 or with the front-side traveling motor M1, a speed reducer, a transmission, and so forth. Further, the rear-side traveling motor M2 produces a driving force for driving left and right rear wheels RT, and a rear-side power train PT2 is configured with only the rear-side traveling motor M2 or with the rear-side traveling motor M2, a speed reducer, a transmission, and so forth.

In the present embodiment, the rear-side traveling motor M2 is configured to produce a highest output (maximum torque) which is high compared to the front-side traveling motor M1, and the rear-side traveling motor M2 has a larger size than the front-side traveling motor M1. Accompanying that, the rear-side power train PT2 becomes larger than the front-side power train PT1. Note that the rear-side traveling motor M2 may produce a highest output which is low compared to the front-side traveling motor M1, or the rear-side traveling motor M2 and the front-side traveling motor M1 may produce equivalent highest outputs. Further, only the front-side power train PT1 may be provided, or only the rear-side power train PT2 may be provided.

As illustrated in FIG. 2, the lower structure 2 includes the battery casing 10, a pair of left and right front side frames 11 and 12 which extend forward in front of the battery casing 10, and a pair of left and right rear frame 13 and 14 which extend rearward in the rear of the battery casing 10. A reference numeral 11 denotes the left front side frame, and a reference numeral 12 denotes the right front side frame. A reference numeral 13 denotes the left rear frame, and a reference numeral 14 denotes the right rear frame.

In a case of a common electric automobile, a battery casing is often formed as a separate body from a vehicle body and is often detachable from a portion below a floor; however, in the present embodiment, not only the battery casing 10 but also the left and right front side frames 11 and 12 and the left and right rear frames 13 and 14 are integrated with the battery casing 10, and the front side frames 11 and 12 and the rear frames 13 and 14 together with the battery casing 10 are detachable from the upper structure 3.

Specifically, the electric vehicle 1 of the present embodiment is configured to be capable of being divided, in an up-down direction, into the lower structure 2 having the battery casing 10 and the upper structure 3 forming the vehicle cabin R1 and the trunk R2. Being capable of being divided in the up-down direction means that without using welding, adhesion, or the like, the lower structure 2 is integrated with the upper structure 3 by using fastening members such as bolts, nuts, and screws. Accordingly, because the lower structure 2 can be separated from the upper structure 3 in accordance with necessity when maintenance or repairs are performed after the electric vehicle 1 is passed into the hands of a user, high maintainability is achieved. Note that fastening members used in the following description include bolts, nuts, screws, and so forth.

Here, as a vehicle-body structure of an automobile, a vehicle-body structure of a ladder frame type has been known. In a case of the vehicle-body structure of the ladder frame type, the vehicle-body structure is being capable of being divided, in the up-down direction, into a ladder frame and a cabin, but the ladder frame continuously extends in a front-rear direction and thus mainly receives a collision load in a front collision and a rear collision. In a side collision, the ladder frame only subsidiarily receives a collision load, and the collision load is mainly received by the cabin. As described above, in the vehicle-body structure of the ladder frame type, usually, different members receive collision loads between the front collision and rear collision and the side collision.

On the other hand, in a case of the electric vehicle 1 of the present embodiment, the lower structure 2 having the front side frames 11 and 12 and the rear frame 13 and 14 and the upper structure 3 are capable of being divided; however, a technical idea of the present embodiment is largely different from the vehicle-body structure of the ladder frame type in related art in the point that in both cases of the front collision and rear collision and the side collision, a collision load is received by the lower structure 2 and the upper structure 3, and the collision load is capable of being dispersedly absorbed by both of the structures 2 and 3. In the following, structures of the lower structure 2 and the upper structure 3 will be described in detail.

Upper Structure

First, the upper structure 3 will be described. As illustrated in FIG. 2, the upper structure 3 includes the floor panel 70, a dash panel 71, a pair of left and right front main frames 72 and 73, and a pair of left and right side sills 74 and 75. A reference numeral 72 denotes the left front main frame, and a reference numeral 73 denotes the right front main frame. A reference numeral 74 denotes the left side sill, and a reference numeral 75 denotes the right side sill.

The floor panel 70 configures a floor surface of the vehicle cabin R1 and is formed with a steel plate or the like which extends in the front-rear direction and extends also in the left-right direction. A space above the floor panel 70 serves as the vehicle cabin R1. A roof 80 is provided to an upper portion of the vehicle cabin R1. Further, in both of left and right side portions of the upper structure 3, front openings 3a and rear openings 3b are formed. As illustrated in FIG. 1, the front opening 3a and the rear opening 3b are capable of being opened and closed by a front door 81 and a rear door 82, respectively. A front door and a rear door may be disposed on a right side of the upper structure 3 to be capable of being opened and closed.

The dash panel 71 is a member for partitioning the vehicle cabin R1 from the power chamber R3 in the front-rear direction. The dash panel 71 is configured with a steel plate or the like, for example, extends in the left-right direction, and extends also in an up-down direction. On both of left and right sides of a front portion of the upper structure 3, left and right front wheel well portions 85 and 86 for housing the left and right front wheels FT are respectively provided. A left end portion of the dash panel 71 is connected with the left front wheel well portion 85, and a right end portion of the dash panel 71 is connected with the right front wheel well portion 86.

The left and right front main frames 72 and 73 are disposed in a vehicle-body front portion and are highly strong members which extend in the front-rear direction. That is, the left and right front main frames 72 and 73 are positioned in front of the floor panel 70, are positioned above the floor panel 70, and are specifically disposed to extend forward from both of left and right sides in a lower portion of the dash panel 71.

The left and right front main frames 72 and 73 form a left-right symmetrical structure and can be configured by joining plural press-formed materials or can be configured with the extruded material, for example. A cross section of each of the front main frames 72 and 73 in a direction orthogonal to the front-rear direction is set larger than a cross section of each of the front side frames 11 and 12 of the lower structure 2 in the same direction. Accordingly, the front main frames 72 and 73 become thick and highly strong members compared to the front side frames 11 and 12.

Front end portions of the left and right front main frames 72 and 73 respectively have the crush cans 72a and 73a which perform compressive deformation in a front collision and absorb collision energy. The crush cans 72a and 73a are tubular members which extend in the front-rear direction. The crush cans 72a and 73a perform compressive deformation due to an impact load from the front in a phase previous to deformation of the front main frames 72 and 73 and thereby absorb the impact load. The front bumper reinforcement 87 extending in the left-right direction is fixed to front end portions of the left and right front crush cans 72a and 73a.

The left and right side sills 74 and 75 are respectively disposed in both of left and right end portions of the floor panel 70 to extend in the front-rear direction. The left end portion of the floor panel 70 is connected with an intermediate portion of the left side sill 74 in the up-down direction, and the right end portion of the floor panel 70 is connected with an intermediate portion of the right side sill 75 in the up-down direction. Upper-side portions of the side sills 74 and 75 are protruded upward from connection portions with the floor panel 70, and lower-side portions of the side sills 74 and 75 are protruded downward from the connection portions with the floor panel 70. Because the battery casing 10 is arranged below the floor panel 70, the battery casing 10 is arranged such that the lower-side portions of the side sills 74 and 75 overlap with the battery casing 10 in a vehicle side view. The battery casing 10 is fixed to the side sills 74 and 75.

Lower Structure

Next, the lower structure 2 will be described. The lower structure 2 includes the front and rear power trains PT1 and PT2, the front wheels FT, the rear wheels RT, front suspension apparatuses 20, rear suspension apparatuses 21, and so forth in addition to the battery casing 10, the front side frames 11 and 12, and the rear frames 13 and 14. Forms of the front suspension apparatus 20 and the rear suspension apparatus 21 are not particularly specified.

The battery casing 10 is a large casing below the floor panel 70 of the upper structure 3, to be spanned from a left end portion vicinity to a right end portion vicinity of the floor panel 70 and to be spanned from a front end portion vicinity to a rear end portion vicinity of the floor panel 70. As described above, the battery casing 10 is provided in a wide range of a lower region of the floor panel 70, and it thereby becomes possible to install the battery B with a large capacity in the electric vehicle 1. The battery B may be a lithium-ion battery, a solid-state battery, or the like or may be another secondary cell. Further, the battery B may be a so-called battery cell or may be a battery pack housing plural battery cells. In the present embodiment, the battery B is configured with a battery pack, and plural battery packs are installed in a state where those are aligned in the front-rear direction and the left-right direction.

Figure 3:
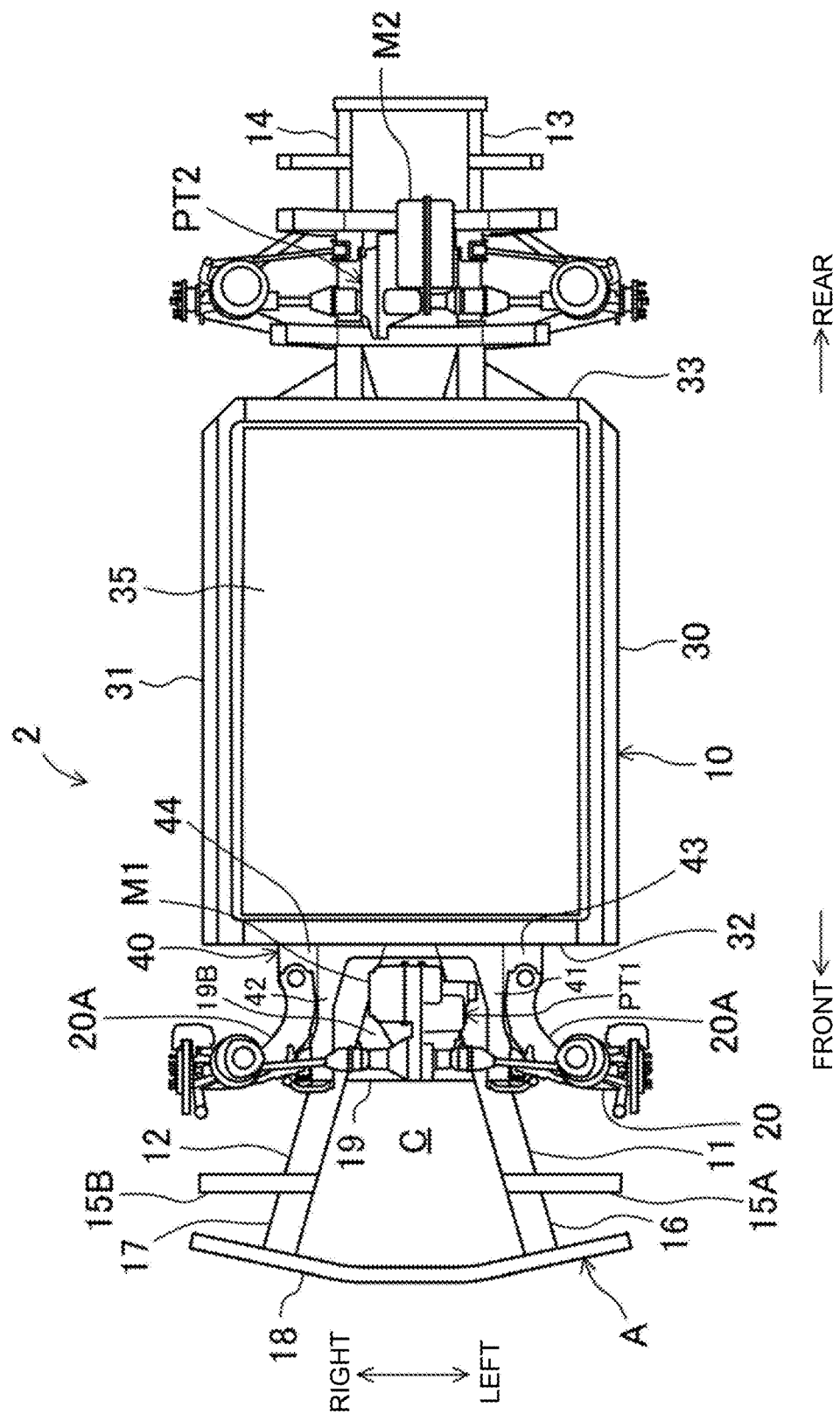
FIG. 3 is a plan view of the lower structure.

The battery casing 10 includes a left-side battery frame 30, a right-side battery frame 31, a front-side battery frame 32, a rear-side battery frame 33, a bottom plate 34, and the lid body 35 (illustrated in FIG. 3). Note that FIG. 2 illustrates a state where the lid body 35 is detached.

The left-side battery frame 30, the right-side battery frame 31, the front-side battery frame 32, and the rear-side battery frame 33 are configured with an extruded material or the like of an aluminum alloy, for example, but may be configured with an aluminum alloy plate material or a press-formed material of a steel plate as well. The bottom plate 34 can be configured with an extruded material. In the following description, "extruded material" denotes an extruded material of an aluminum alloy, and "press-formed material" denotes an aluminum alloy plate material or a press-formed material of a steel plate. Further, each member may be configured with a casting, for example.

All of cross-sectional shapes of the left-side battery frame 30, the right-side battery frame 31, the front-side battery frame 32, and the rear-side battery frame 33 in respective orthogonal directions to their longitudinal directions are rectangular shapes. Further, the left-side battery frame 30, the right-side battery frame 31, the front-side battery frame 32, and the rear-side battery frame 33 are all arranged at the same height and extend in generally horizontal directions.

The left-side battery frame 30 is provided to a left-side portion of the battery casing 10 and extends in the front-rear direction. The right-side battery frame 31 is provided to a right-side portion of the battery casing 10 and extends in the front-rear direction. Further, the front-side battery frame 32 is provided to a front portion of the battery casing 10 and extends in the left-right direction. The rear-side battery frame 33 is provided to a rear portion of the battery casing 10 and extends in the left-right direction.

A left end portion of the front-side battery frame 32 is connected with a front end portion of the left-side battery frame 30, and a right end portion of the front-side battery frame 32 is connected with a front end portion of the right-side battery frame 31. A left end portion of the rear-side battery frame 33 is connected with a rear end portion of the left-side battery frame 30, and a right end portion of the rear-side battery frame 33 is connected with a rear end portion of the right-side battery frame 31. Consequently, the left-side battery frame 30, the right-side battery frame 31, the front-side battery frame 32, and the rear-side battery frame 33 form a rack which surrounds all of the batteries B in a plan view.

The bottom plate 34 extends generally horizontally and is fixed to lower surfaces of the left-side battery frame 30, the right-side battery frame 31, the front-side battery frame 32, and the rear-side battery frame 33. Further, the lid body 35 is fixed to the lower surfaces of the left-side battery frame 30, the right-side battery frame 31, the front-side battery frame 32, and the rear-side battery frame 33. Consequently, a battery housing space S housing the batteries B (illustrated in FIG. 2) is marked off and formed with the left-side battery frame 30, the right-side battery frame 31, the front-side battery frame 32, the rear-side battery frame 33, the bottom plate 34, and the lid body 35.

The size of the battery housing space S can be changed in accordance with the capacity of the installed batteries B. The size of the battery housing space S is capable of being easily changed by changing lengths of the left-side battery frame 30, the right-side battery frame 31, the front-side battery frame 32, and the rear-side battery frame 33 and a shape of the bottom plate 34. For example, in a case where the electric vehicle 1 is a small vehicle which has a short wheelbase and narrow treads, the left-side battery frame 30, the right-side battery frame 31, the front-side battery frame 32, the rear-side battery frame 33 are made short, the shapes of the bottom plate 34 and the lid body 35 are made small in response to the shortening, and the battery housing space S thereby becomes small in accordance with the small vehicle. On the other hand, in a case of a large vehicle, the left-side battery frame 30, the right-side battery frame 31, the front-side battery frame 32, and the rear-side battery frame 33 are made long, the shapes of the bottom plate 34 and the lid body 35 are made large in response to the elongation, and the battery housing space S thereby becomes large in accordance with the large vehicle. In a case where the left-side battery frame 30, the right-side battery frame 31, the front-side battery frame 32, and the rear-side battery frame 33 are configured with the extruded material, the lengths can easily be changed. Further, the bottom plate 34 can be configured with the extruded material, and its shape can thereby easily be changed.

An upper portion of the battery housing space S may be closed by the above lid body 35 or may be closed by the floor panel 70 of the upper structure 3. In the battery housing space S, other than the batteries B, a cooling device cooling the batteries B, a heating device heating the batteries B, and so forth (temperature adjustment devices) can also be provided. Further, electric power of the batteries B is supplied to the traveling motors M1 and M2 via a control device. In addition, it is possible to charge the batteries B via a charging socket, a contactless charger, or the like.

As illustrated in FIG. 2, in the internal portion of the battery casing 10, as strength members extending in the left-right direction, first to third inside-casing members 25A, 25B, and 25C are provided. All of heights of the first to third inside-casing members 25A, 25B, and 25C are the same and are generally the same as the heights of the left-side battery frame 30 and so forth. The inside-casing members 25A, 25B, and 25C may be configured with the extruded material or may be configured with the press-formed material. In the present embodiment, three inside-casing members 25A, 25B, and 25C are provided, but the number of inside-casing members 25A, 25B, and 25C may be increased or decreased in accordance with the dimension of the battery casing 10 in the front-rear direction.

The first to third inside-casing members 25A, 25B, and 25C are arranged at distances from each other in the front-rear direction, the first inside-casing member 25A is in a foremost position, and the third inside-casing member 25C is in a rearmost position. A lower portion of each of the inside-casing members 25A, 25B, and 25C is fixed to an upper surface of the bottom plate 34. Further, a left end portion of each of the inside-casing members 25A, 25B, and 25C is fixed to an inner surface (right-side surface) of the left-side battery frame 30, and a right end portion of each of the inside-casing members 25A, 25B, and 25C is fixed to an inner surface (left-side surface) of the right-side battery frame 31. In other words, the inside-casing members 25A, 25B, and 25C are members which connect the left-side battery frame 30 and the right-side battery frame 31 together.

In the internal portion of the battery casing 10, as strength members extending in the front-rear direction, a front central member 26 and first to third rear central members (rear reinforcement members) 27 to 29 are provided. The front central member 26 and the first to third rear central members 27 to 29 are arranged at generally the same heights and are provided at a center of the battery casing 10 in the left-right direction. Lower end portions of the front central member 26 and the first to third rear central members 27 to 29 are mounted on the upper surface of the bottom plate 34.

The front central member 26 is arranged between the front-side battery frame 32 and the first inside-casing member 25A, a front end portion of the front central member 26 is fixed to a central portion of the front-side battery frame 32 in the left-right direction, and a rear end portion of the front central member 26 is fixed to a central portion of the first inside-casing member 25A in the left-right direction. Consequently, the front-side battery frame 32 is a member which extends so as to connect the front end portions of the left-side battery frame 30 and the right-side battery frame 31 with the front end portion of the front central member 26.

The first rear central member 27 is arranged between the first inside-casing member 25A and the second inside-casing member 25B, a front end portion of the first rear central member 27 is fixed to the central portion of the first inside-casing member 25A in the left-right direction, and a rear end portion of the first rear central member 27 is fixed to a central portion of the second inside-casing member 25B in the left-right direction. Further, the second rear central member 28 is arranged between the second inside-casing member 25B and the third inside-casing member 25C, a front end portion of the second rear central member 28 is fixed to the central portion of the second inside-casing member 25B in the left-right direction, and a rear end portion of the second rear central member 28 is fixed to a central portion of the third inside-casing member 25C in the left-right direction. Further, the third rear central member 29 is arranged between the third inside-casing member 25C and the rear-side battery frame 33, a front end portion of the third rear central member 29 is fixed to the central portion of the third inside-casing member 25C in the left-right direction, and a rear end portion of the third rear central member 29 is fixed to a central portion of the rear-side battery frame 33 in the left-right direction. Consequently, because the first to third inside-casing members 25A, 25B, and 25C and the front central member 26 and first to third rear central members 27 to 29 are disposed in a lattice manner in the internal portion of the battery casing 10 and are coupled with each other, a reinforcement effect for the battery casing 10 is further enhanced.

When an imaginary straight line extending in the front-rear direction is presumed in a plan view, the positions of the front central member 26 and the first to third rear central members 27 to 29 in the left-right direction are set such that the positions are arranged on the imaginary straight line. In other words, the first to third rear central members 27 to 29 are provided to be positioned on a rearward imaginary extension line of the front central member 26. Note that the front central member 26 and the first to third rear central members 27 to 29 may be configured with one member which is continuous in the front-rear direction.

Figure 4:
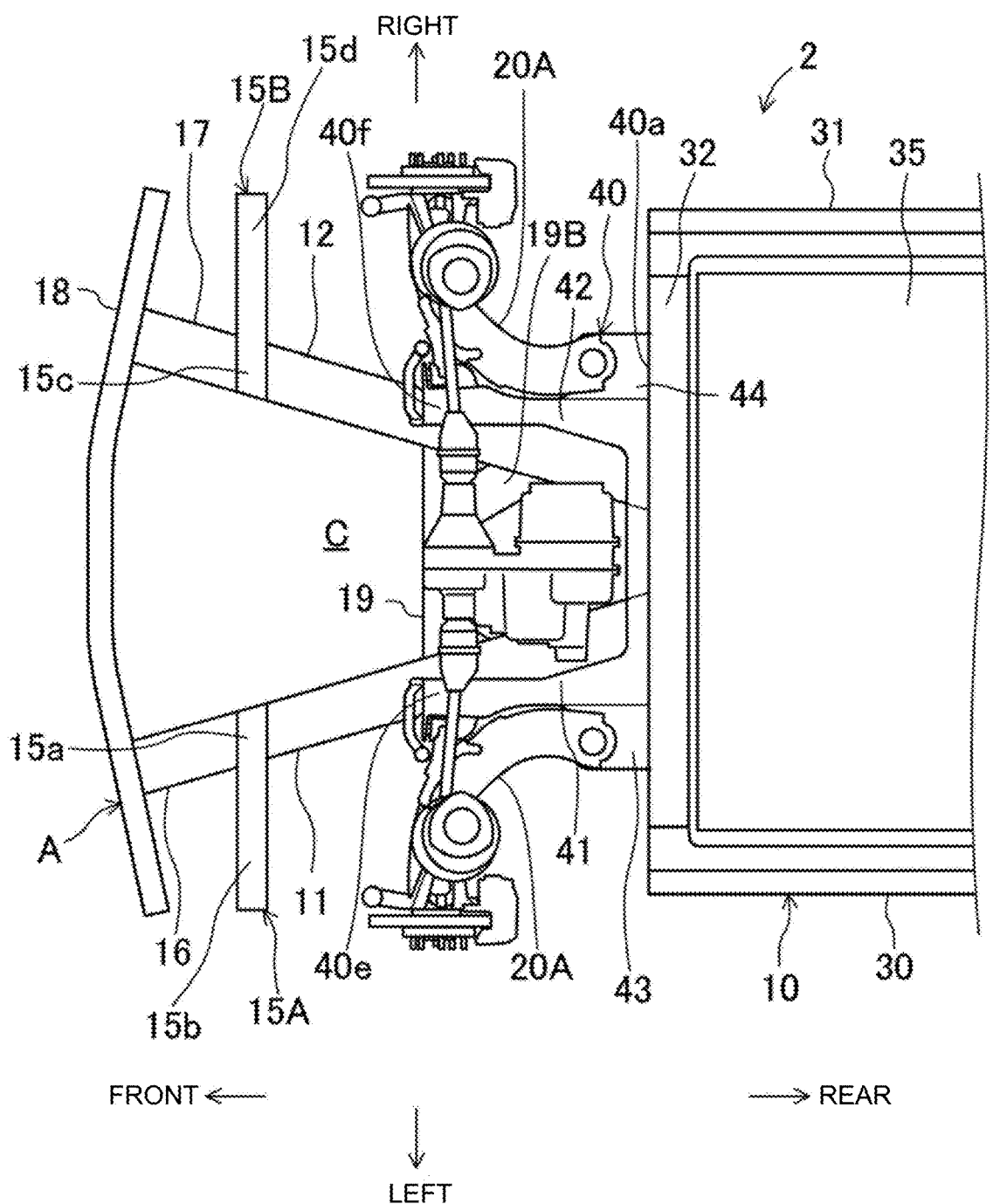
FIG. 4 is an enlarged plan view of a front-side portion of the lower structure.
Figure 5:
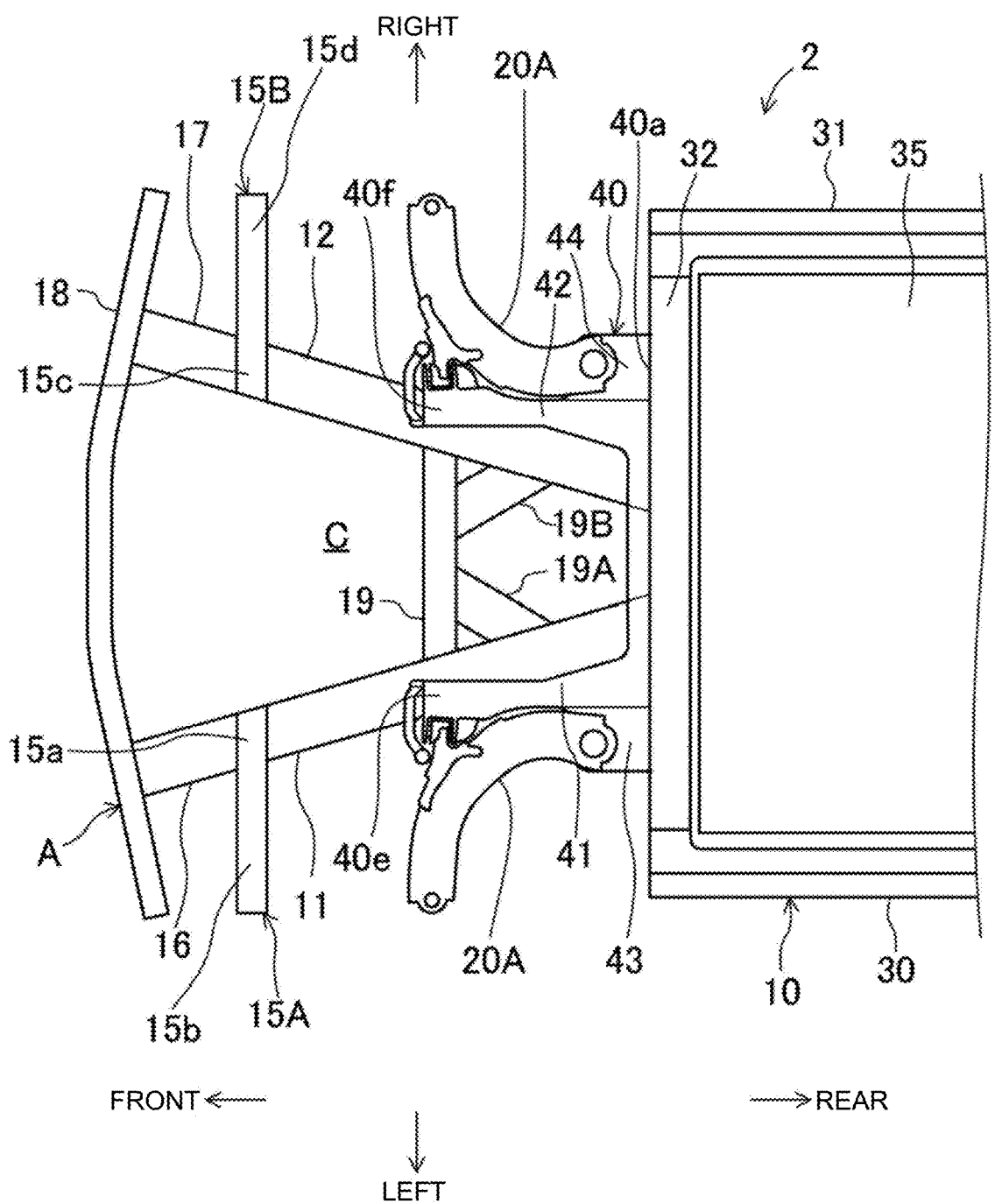
FIG. 5 is a diagram which corresponds to FIG. 4 and from which a power train, shock absorbers, springs, hubs, and so forth are omitted for clarity.
Figure 6:
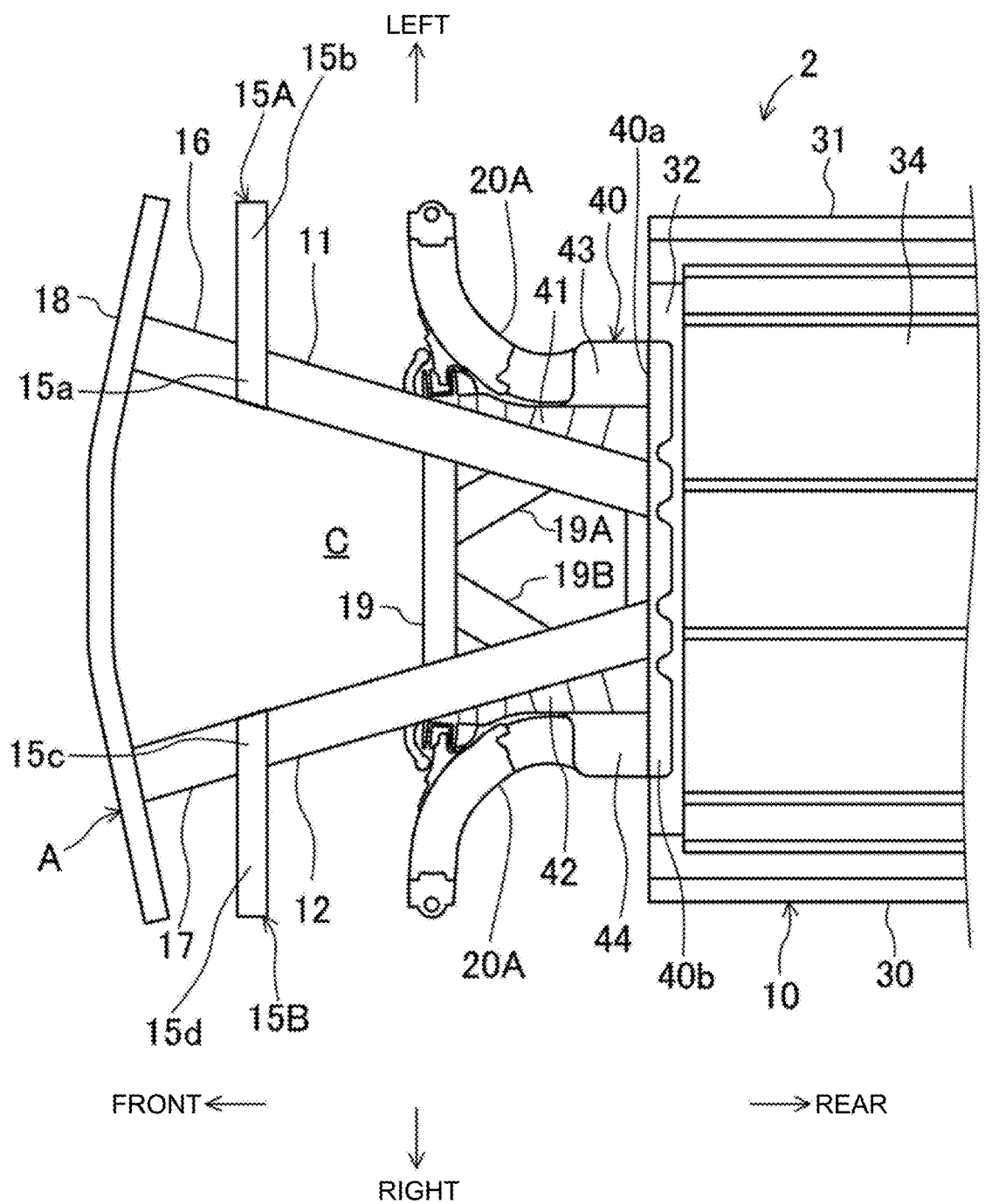
FIG. 6 is an enlarged bottom view of the front-side portion of the lower structure, from which the power train, shock absorbers, springs, hubs, and so forth are omitted for clarity.

As illustrated in FIGS. 4 to 6 and so forth, the vehicle-body front structure A includes the pair of left and right front side frames 11 and 12, a frame bracket 40, a pair of left and right protruded members 15A and 15B (or left and right projections), a pair of left and right impact absorption members 16 and 17, and a cross member 19. In the present embodiment, in addition to the above members, the vehicle-body front structure A includes a front member 18, reinforcement members 19A and 19B, and so forth. Members configuring the vehicle-body front structure A are not limited to the above-described members and may include other members, apparatuses, devices, and so forth.

The front side frames 11 and 12 linearly and generally horizontally extend below left and right front main frames 72 and 73 provided to the upper structure 3. The front side frames 11 and 12 can be configured with the extruded material, the press-formed material, or the like, for example. In the present embodiment, because the front side frames 11 and 12 are configured with the extruded material, their cross-sectional shapes in a direction orthogonal to the front-rear direction are generally equivalent from front end portions to rear end portions.

The left and right front side frames 11 and 12 are mounted on the front-side battery frame 32 configuring the front portion of the battery casing 10 via the frame bracket 40. In other words, rear portions of the left and right front side frames 11 and 12 are coupled with the front-side battery frame 32 by the frame bracket 40. Outer end portions of the front-side battery frame 32 in the vehicle width direction extend to the vehicle-width-direction outer side of the rear portion of the left front side frame 11 and extend to the vehicle-width-direction outer side of the rear portion of the right front side frame 12, respectively.

The frame bracket 40 is an integrally formed component of metal and extends in the left-right direction along a front surface of the front-side battery frame 32. The rear portions of the left and right front side frames 11 and 12 are fixed to the frame bracket 40. Metal which configures the frame bracket 40 is not particularly limited. For example, aluminum and so forth can be raised, and in this case, the frame bracket 40 can be formed by aluminum die-casting.

The left and right front side frames 11 and 12 are mounted on the front-side battery frame 32 via the frame bracket 40, but the rear portions of the front side frames 11 and 12 are caused to adjoin the front surface of the front-side battery frame 32. Consequently, the front side frames 11 and 12 extend forward from the front-side battery frame 32. Note that the rear portion of the front side frames 11 and 12 may slightly be spaced apart forward from the front surface of the front-side battery frame 32. In this case also, viewing those as the whole, it can be considered that the front side frames 11 and 12 extend forward from the front-side battery frame 32.

The rear portion of the left front side frame 11 is arranged to correspond to a section on a left side of a center of the front-side battery frame 32 in the left-right direction. Further, the rear portion of the right front side frame 12 is arranged to correspond to a section on a right side of the center of the front-side battery frame 32 in the left-right direction. Accordingly, a distance between the left and right front side frames 11 and 12 becomes a predetermined distance. A distance between the rear portions of the front side frames 11 and 12 is set narrower than a distance between the left-side battery frame 30 and the right-side battery frame 31 of the battery casing 10.

Heights of the left and right front side frames 11 and 12 are generally the same. Further, the left and right front side frames 11 and 12, the front central member 26 of the battery casing 10, the left-side battery frame 30, and the right-side battery frame 31 are disposed at generally the same heights.

The left and right front side frames 11 and 12 extend to be positioned on the vehicle-width-direction outer sides toward the front. That is, the left front side frame 11 is inclined, e.g., forms a negative acute angle, with respect to the imaginary straight line extending in the front-rear direction of the vehicle in a plan view so as to be positioned on a left side toward the front. Further, the right front side frame 12 is inclined, e.g., forms a positive acute angle, with respect to the imaginary straight line extending in the front-rear direction of the vehicle in a top plan view so as to be positioned on a right side toward the front. Accordingly, the distance between the left and right front side frames 11 and 12 (a separation distance in the vehicle width direction) becomes wider toward the front, e.g., increases from the rear portions to the front portions. A space C is formed between the left and right front side frames 11 and 12 in which all or a part of various components, apparatuses, devices, and so forth are capable of being arranged. Then, the space C has a shape which is enlarged in the vehicle width direction toward the front. Additionally, a distance of the front portions of the front side frames 11 and 12 may be narrower than a distance between the left-side battery frame 30 and the right-side battery frame 31 of the battery casing 10.

An inclination angle of the left front side frame 11 with respect to the above imaginary straight line is equivalent to an inclination angle of a right front side frame 12 with respect to the above imaginary straight line. A front portion of the left front side frame 11 is arranged on a vehicle-width-direction inner side of the left-side battery frame 30 of the battery casing 10. Further, a front portion of the right front side frame 12 is arranged on the vehicle-width-direction inner side of the right-side battery frame 31 of the battery casing 10.

Further, as illustrated in FIG. 1, positions, in the front-rear direction, of the front portions of the left and right front side frames 11 and 12 and of front portions of the left and right front main frames 72 and 73 of the upper structure 3 are set to generally the same positions.

Figure 7:
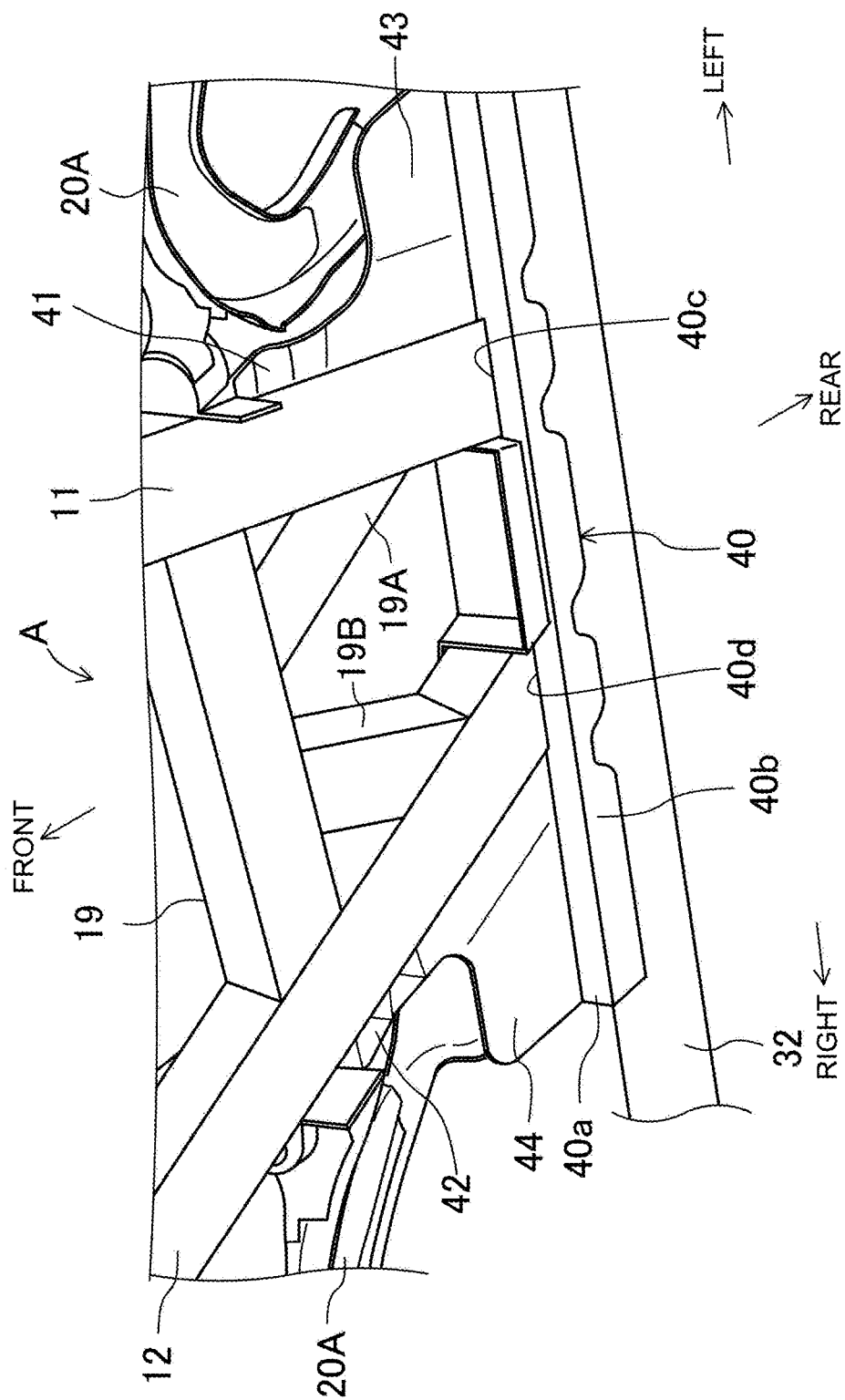
FIG. 7 is a perspective view of a periphery of rear-side portions of front side frames as seen from below.

As illustrated in FIG. 7, the frame bracket 40 includes a vertical plate portion 40a which extends in the vehicle width direction and the up-down direction along the front surface of the front-side battery frame 32 and a lower plate portion 40b which extends rearward from a lower edge portion of the vertical plate portion 40a along the lower surface of the front-side battery frame 32 and which extends also in the vehicle width direction. The vertical plate portion 40a and the lower plate portion 40b are fixed to the front-side battery frame 32 by fastening members or the like. In such a manner, the vertical plate portion 40a and the lower plate portion 40b of the frame bracket 40 are respectively fixed to the front surface and the lower surface of the front-side battery frame 32, and mounting rigidity of the frame bracket 40 on the front-side battery frame 32 can thereby be enhanced.

In the vertical plate portion 40a of the frame bracket 40, a left-side insertion hole 40c into which the rear portion of the left front side frame 11 is inserted and a right-side insertion hole 40d into which the rear portion of the right front side frame 12 is inserted are formed at a distance in the vehicle width direction. The rear portion of the left front side frame 11 is fixed to the frame bracket 40 by an adhesive, a fastening member, or the like, for example, in a state where the rear portion is inserted into the left-side insertion hole 40c.

As illustrated in FIG. 5, the frame bracket 40 includes a left-side upper plate portion 40e which extends in the front-rear direction so as to cover an upper surface of the left front side frame 11 and a right-side upper plate portion 40f which extends in the front-rear direction so as to cover an upper surface of the right front side frame 12. The left-side upper plate portion 40e and the upper surface of the left front side frame 11 are caused to adhere to each other by an adhesive, for example, and the right-side upper plate portion 40f and the upper surface of the right front side frame 12 are similarly caused to adhere to each other. Accordingly, the left and right front side frames 11 and 12 can firmly be fixed to the frame bracket 40.

The frame bracket 40 has a left-side support portion 41 and a right-side support portion 42, and the left-side support portion 41 and the right-side support portion 42 are integrally shaped with the vertical plate portion 40a and the lower plate portion 40b. The left-side support portion 41 is a portion which is arranged on the vehicle-width-direction outer side (left side) of the left front side frame 11 and supports the above front side frame 11 from the vehicle-width-direction outer side. Specifically, the left-side support portion 41 protrudes forward from a left-side portion of the left-side insertion hole 40c in the vertical plate portion 40a and extends along a left side surface of the left front side frame 11. A front portion of the left-side support portion 41 reaches the vicinity of a central portion of the left front side frame 11 in the front-rear direction, and it thus becomes possible to support a wide range of the left-side support portion 41 by the left-side support portion 41. It is also possible to cause the left front side frame 11 to adhere to the left-side support portion 41.

Further, the right-side support portion 42 is a portion which is arranged on the vehicle-width-direction outer side (right side) of the right front side frame 12 and supports the above front side frame 12 from the vehicle-width-direction outer side. Specifically, the right-side support portion 42 protrudes forward from a right-side portion of the right-side insertion hole 40d in the vertical plate portion 40a and extends along a right side surface of the right front side frame 12. A front portion of the right-side support portion 42 reaches the vicinity of a central portion of the right front side frame 12 in the front-rear direction, and it thus becomes possible to support a wide range of the right-side support portion 42 by the right-side support portion 42. It is also possible to cause the right front side frame 12 to adhere to the right-side support portion 42.

On the vehicle-width-direction outer side of the frame bracket 40, left and right suspension arms 20A configuring the front suspension apparatuses 20 are supported to be swingable in the up-down direction. That is, in a portion on a left side of the left-side support portion 41 in the frame bracket 40, a left-side arm mounting portion 43 is provided to be protruded to a left side. On the left-side arm mounting portion 43, a base end portion of the left suspension arm 20A is mounted to be rotatable around a shaft extending in the front-rear direction. Further, in a portion on a right side of the right-side support portion 42 in the frame bracket 40, a right-side arm mounting portion 44 is provided to be protruded to a right side. On the right-side arm mounting portion 44, a base end portion of the right suspension arm 20A is mounted to be rotatable around a shaft extending in the front-rear direction.

The first cross member 19 is a member, which is suspended between the left front side frame 11 and the right front side frame 12, and linearly extends in the vehicle width direction. The cross member 19 can also be configured with the extruded material, the press-formed member, or the like.

As also illustrated in FIG. 7, a left end portion of the cross member 19 is fixed to a right side surface of the left front side frame 11 by adhesion, welding, a fastening member, or the like. A right end portion of the cross member 19 is similarly fixed to a left side surface of the right front side frame 12. Accordingly, intermediate portions of the left and right front side frames 11 and 12 in the front-rear direction are coupled with each other.

Further, the cross member 19 is generally parallel with the front-side battery frame 32. Accordingly, in a plan view, a quadrilateral shape (a trapezoidal shape, e.g., an isosceles trapezoid, in the present example) is formed with the cross member 19, the left and right front side frames 11 and 12, and the front-side battery frame 32, and a closed cross-section is configured when a horizontal cross section is seen.

As illustrated in FIG. 5, the left reinforcement member 19A extends rearward from a portion on a left side of a central portion of the cross member 19 in the vehicle width direction to the front-side battery frame 32. A rear portion of the left reinforcement member 19A is fixed to the right side surface of the left front side frame 11. Further, the right reinforcement member 19B extends rearward from a portion on a right side of the central portion of the cross member 19 in the vehicle width direction to the front-side battery frame 32. A rear portion of the right reinforcement member 19B is fixed to the left side surface of the right front side frame 12.

The left impact absorption member 16 is provided in front of the left front side frame 11 and is configured with a tubular member which extends forward. Further, the right impact absorption member 17 is provided in front of the right front side frame 12 and is configured with a tubular member which extends forward. Similarly to crush cans 72a and 73a of the upper structure 3, the impact absorption members 16 and 17 perform compressive deformation due to an impact load from the front in a phase previous to deformation of the front side frames 11 and 12 and thereby absorb the impact load. As illustrated in FIG. 1, positions, in the front-rear direction, of rear portions of the left and right impact absorption members 16 and 17 and of rear portions of the crush cans 72a and 73a of the upper structure 3 are set to generally the same positions.

The left protruded member 15A is between the left front side frame 11 and the left impact absorption member 16 and protrudes to the vehicle-width-direction outer side (left side) of the front portion of the front side frame 11. The left protruded member 15A is closer to the front member 18 than to the front-side battery frame 32 or the cross member 19 along the front-rear direction. The left protruded member 15A has a base portion 15a, which is fixed to the front portion of the left front side frame 11 and to the left impact absorption member 16 and couples the impact absorption member 16 with the front side frame 11, and a protruded portion 15b, which protrudes from the base portion 15a to the vehicle-width-direction outer side, and is configured with a tubular member which extends in the vehicle width direction. An end portion of the protruded portion 15b is positioned on the vehicle-width-direction outer side of a front portion of the left impact absorption member 16. In the example shown, the end of the protruded portion 15b extends outward to the left as far as a left end of the front member 18. Further, the left protruded member 15A is configured with the extruded material, the press-formed member, or the like, for example.

A right protruded member 15B is configured to form left-right symmetry with the left protruded member 15A, is between the right front side frame 12 and the right impact absorption member 17, and protrudes to the vehicle-width-direction outer side (right side) of the front portion of the front side frame 12. The right protruded member 15B is closer to the front member 18 than to the front-side battery frame 32 or the cross member 19 along the front-rear direction. The right protruded member 15B has a base portion 15c, which is fixed to the front portion of the right front side frame 12 and to the right impact absorption member 17 and couples the impact absorption member 17 with the front side frame 12, and a protruded portion 15d, which protrudes from the base portion 15c to the vehicle-width-direction outer side. In the example shown, an end of the protruded portion 15d extends outward to the right as far as a right end of the front member 18.

A direction in which the left impact absorption member 16 extends is along the longitudinal direction of the left front side frame 11, and an axis line of the impact absorption member 16 is positioned on a forward extension line of the front side frame 11. Further, a direction in which the right impact absorption member 17 extends is along the longitudinal direction of the right front side frame 12, and an axis line of the impact absorption member 17 is positioned on a forward extension line of the front side frame 12.

As illustrated in FIG. 3, FIG. 4 and so forth, the front member 18 is a member which is suspended between the left and right impact absorption members 16 and 17. A portion on a left side of a central portion of the front member 18 in the vehicle width direction is fixed to a front portion of the left impact absorption member 16, and a portion on a right side of the central portion of the front member 18 in the vehicle width direction is fixed to a front portion of the right impact absorption member 17. Accordingly, the left and right impact absorption members 16 and 17 are coupled together by the front member 18. As illustrated in FIG. 1, positions, in the front-rear direction, of the front member 18 and of a front bumper reinforcement 87 of the upper structure 3 are set to generally the same positions, and the front member 18 is positioned directly below the front bumper reinforcement 87.

Outer end portions of the front member 18 in the vehicle width direction extend to the vehicle-width-direction outer side of the front portion of the left front side frame 11 and extend to the vehicle-width-direction outer side of the front portion of the right front side frame 12, respectively. That is, a left end portion of the front member 18 extends to the left side of the front portion of the left front side frame 11, and a right end portion of the front member 18 extends to the right side of the front portion of the right front side frame 12.

Further, when seen in the front-rear direction, the outer end portions of the front member 18 in the vehicle width direction are arranged to overlap with at least the protruded portions 15b and 15d of the protruded members 15A and 15B. In other words, the outer end portions of the front member 18 in the vehicle width direction and ends of the protruded portions 15b and 15d are positioned at generally the same heights.

Working Effects of Embodiment

Figure 8:
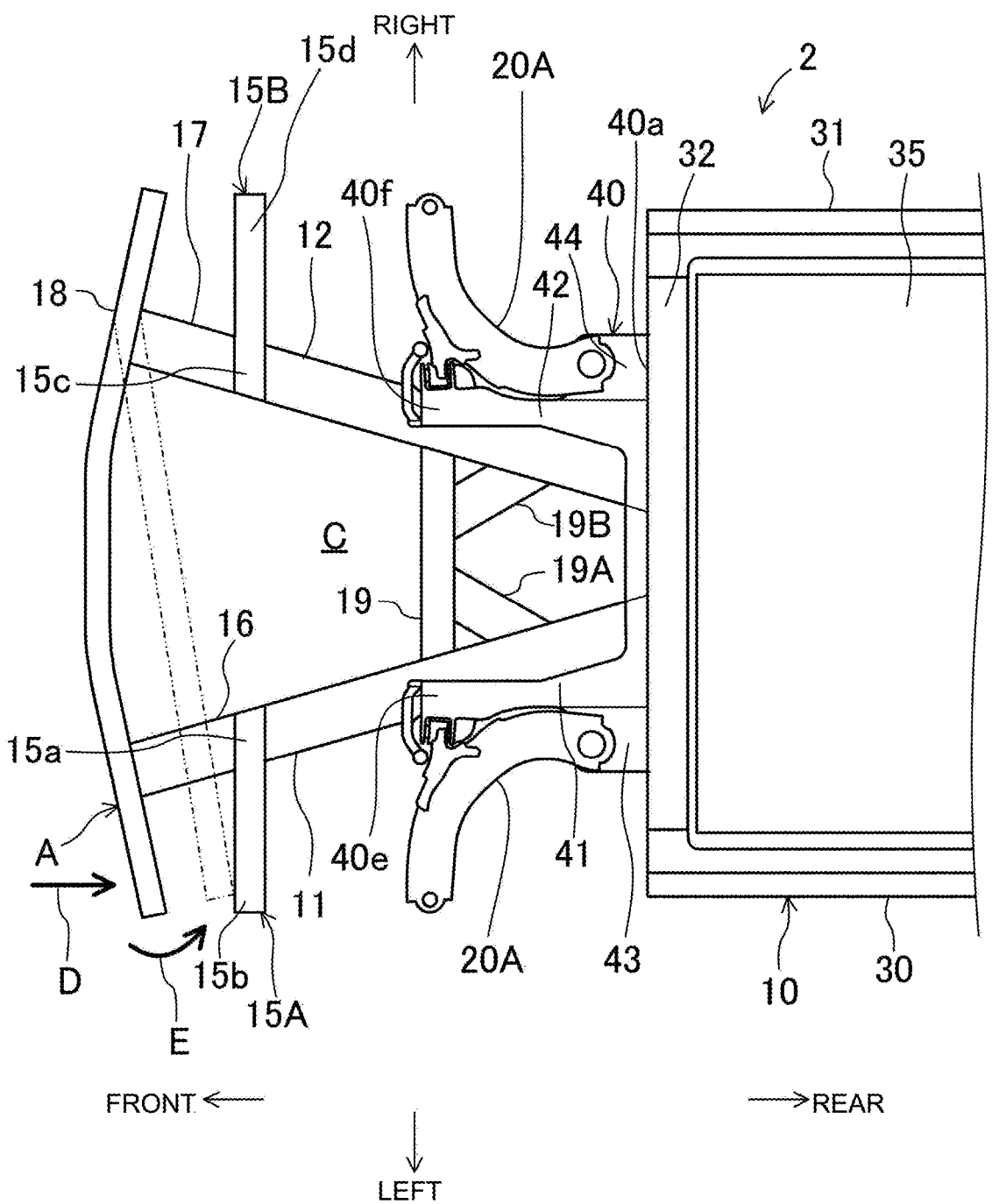
FIG. 8 is a diagram for explaining a collision.

Next, a description will be made about a collision of the electric vehicle 1 which is configured as described above. For example, as illustrated in FIG. 8, an offset collision is presumed in which an impact load (an impact load in a direction indicated by an arrow D) is input to the left side of the front portion of the left front side frame 11. First, when the upper structure 3 illustrated in FIG. 2 and so forth is described, a part of the impact load in the arrow D direction is input to and absorbed by the left crush can 72a and the left front main frame 72 via the front bumper reinforcement 87. Next, when the lower structure 2 is described, the impact load in the arrow D direction indicated in FIG. 8 is input to a left side, of the impact absorption member 16, in the front member 18, and the impact absorption member 16 is compressed and deformed. When the impact absorption member 16 is compressed and deformed, the impact load in the arrow D direction is exerted on a left end portion of the left protruded member 15A. In this case, because a right-side portion (non-collision side) of the front member 18 is fixed to the right front side frame 12 via the right impact absorption member 17, the front member 18 rotates in which its left-side portion moves rearward about the right-side portion as a pivot as indicated by imaginary lines and an arrow E. Because the left protruded member 15A is positioned in the rear of the left end portion of the front member 18, the impact load is transmitted from the front member 18 to the left protruded member 15A and thereafter transmitted to the left front side frame 11. Because the impact load is input in a direction along an axis direction of the left front side frame 11, the left front side frame 11 is axially compressed, and the impact load is thereby absorbed. The same applies to an offset collision in which an impact load is input to the right side of the front portion of the right front side frame 12.

The above-described embodiment is merely an example in all respects and is not to be construed in a limited manner. Furthermore, all modifications and changes belonging to the equivalent scope of the claims are included in the scope of the present invention.

INDUSTRIAL APPLICABILITY

As described in the foregoing, a vehicle-body front structure according to the present disclosure can be provided to an electric vehicle, for example.

REFERENCE SIGNS LIST 1 electric vehicle
10 battery casing
11, 12 front side frame
15A, 15B protruded member
15a base portion
15b protruded portion
16, 17 impact absorption member
18 front member
19 cross member
32 front-side battery frame
40 frame bracket
70 floor panel
A vehicle-body front structure
B battery
M1 traveling motor

The invention claimed is:

1. A vehicle-body front structure for an electric vehicle which includes a traveling motor and a battery casing which houses a battery supplying electric power to the traveling motor, the battery casing being disposed below a floor panel, the vehicle-body front structure comprising:
   a front-side battery frame on a front side of the battery casing;
   a pair of left and right side frames which extend from the front-side battery frame toward a vehicle front so that the left and right side frames are positioned on vehicle-width-direction outer sides;
   a pair of left and right impact absorption members respectively provided in front of the left and right side frames;
   a front member that extends between the left and right impact absorption members; and
   a left projection member located between the left side frame and the left impact absorption member, wherein the left projection member protrudes toward the vehicle-width-direction outer side at a front end of the left side frame, and
   a right projection member located between the right side frame and the right impact absorption member, wherein the right projection member protrudes toward the vehicle-width-direction outer side at a front end of the right side frame.

2. The vehicle-body front structure according to claim 1, comprising a frame bracket which couples rear portions of the left and right side frames with the front-side battery frame, wherein the frame bracket has a left-side support on the vehicle-width-direction outer side of the left side frame and supports the left side frame from the vehicle-width-direction outer side and a right-side support on the vehicle-width-direction outer side of the right side frame and supports the right side frame from the vehicle-width-direction outer side.

3. The vehicle-body front structure according to claim 2, wherein
   the front-side battery frame extends in a vehicle width direction, and
   outer ends of the front-side battery frame in the vehicle width direction extend to the vehicle-width-direction outer side of a rear of the left side frame and extend to the vehicle-width-direction outer side of a rear of the right side frame, respectively.

4. The vehicle-body front structure according to claim 3, wherein
   the left projection has a base fixed to the front of the left side frame and to the left impact absorption member and couples the left impact absorption member with the left side frame, and a protrusion that protrudes from the base to the vehicle-width-direction outer side, and
   the right projection has a base fixed to the front of the right side frame and to the right impact absorption member and couples the right impact absorption member with the right side frame, and a protrusion that protrudes from the base to the vehicle-width-direction outer side.

5. The vehicle-body front structure according to claim 4, wherein
outer ends of the front member in the vehicle width direction extend to the vehicle-width-direction outer side of the front of the left side frame and extend to the vehicle-width-direction outer side of the front of the right side frame, respectively.

6. The vehicle-body front structure according to claim 5, wherein
when seen in a vehicle front-rear direction, the outer ends of the front member in the vehicle width direction overlaps with at least a part of the left projection and the right projection, respectively.

7. The vehicle-body front structure according to claim 3, wherein
outer ends of the front member in the vehicle width direction extend to the vehicle-width-direction outer side of the front of the left side frame and extend to the vehicle-width-direction outer side of the front of the right side frame, respectively.

8. The vehicle-body front structure according to claim 2, wherein
the left projection has a base fixed to the front of the left side frame and to the left impact absorption member and couples the left impact absorption member with the left side frame, and a protrusion that protrudes from the base to the vehicle-width-direction outer side, and
the right projection has a base fixed to the front of the right side frame and to the right impact absorption member and couples the right impact absorption member with the right side frame, and a protrusion that protrudes from the base to the vehicle-width-direction outer side.

9. The vehicle-body front structure according to claim 2, wherein
outer ends of the front member in the vehicle width direction extend to the vehicle-width-direction outer side of the front of the left side frame and extend to the vehicle-width-direction outer side of the front of the right side frame, respectively.

10. The vehicle-body front structure according to claim 1, wherein
the front-side battery frame extends in a vehicle width direction, and
outer ends of the front-side battery frame in the vehicle width direction extend to the vehicle-width-direction outer side of a rear of the left side frame and extend to the vehicle-width-direction outer side of a rear of the right side frame, respectively.

11. The vehicle-body front structure according to claim 1, wherein
the left projection has a base fixed to the front of the left side frame and to the left impact absorption member and couples the left impact absorption member with the left side frame, and a protrusion that protrudes from the base to the vehicle-width-direction outer side, and
the right projection has a base fixed to the front of the right side frame and to the right impact absorption member and couples the right impact absorption member with the right side frame, and a protrusion that protrudes from the base to the vehicle-width-direction outer side.

12. The vehicle-body front structure according to claim 1, wherein
outer ends of the front member in the vehicle width direction extend to the vehicle-width-direction outer side of the front of the left side frame and extend to the vehicle-width-direction outer side of the front of the right side frame, respectively.

13. The vehicle-body front structure according to claim 1, wherein the left projection protrudes to the vehicle-width-direction outer side of a front of the left impact absorption member and the right projection protrudes to the vehicle-width-direction outer side of a front of the right impact absorption member.

14. The vehicle-body front structure according to claim 1, wherein
outer ends of the front member in the vehicle width direction extend to the vehicle-width-direction outer side of the front of the left impact absorption member and extend to the vehicle-width-direction outer side of the front of the right impact absorption member, respectively.

15. The vehicle-body front structure according to claim 1, wherein left and right projections are closer to the front member than the front-side battery frame in a vehicle front-rear direction.

* * * * *